US006470313B1

(12) United States Patent
Ojala

(10) Patent No.: US 6,470,313 B1
(45) Date of Patent: Oct. 22, 2002

(54) SPEECH CODING

(75) Inventor: Pasi Ojala, Tokyo (JP)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/263,439

(22) Filed: Mar. 4, 1999

(30) Foreign Application Priority Data

Mar. 9, 1998 (FI) ........................................ 980532

(51) Int. Cl.[7] ........................................ G01L 19/12
(52) U.S. Cl. ........................................ 704/223; 704/222
(58) Field of Search ........................................ 704/219–225, 704/200, 201

(56) References Cited

U.S. PATENT DOCUMENTS 4,969,192 A 11/1990 Chen et al. .................... 381/31
5,140,638 A * 8/1992 Moulsley et al. ........... 704/219
5,226,085 A 7/1993 Di Francesco ............... 381/51
5,233,660 A * 8/1993 Chen .......................... 704/219
5,255,339 A * 10/1993 Fette et al. ................ 704/200
5,293,449 A * 3/1994 Tzeng ........................ 704/219
5,327,520 A 7/1994 Chen ......................... 395/2.28
5,444,816 A 8/1995 Adoul et al. ............... 395/2.28
5,490,230 A * 2/1996 Gerson et al. ............. 704/223
5,651,091 A * 7/1997 Chen .......................... 704/219
5,657,420 A 8/1997 Jacobs et al. .............. 395/2.32
5,664,055 A 9/1997 Kroon ........................ 704/223
5,680,507 A * 10/1997 Chen .......................... 704/223
5,692,101 A 11/1997 Gerson et al. ............ 395/2.31
5,732,389 A * 3/1998 Kroon et al. ............... 704/223
5,742,733 A 4/1998 Jarvinen .................... 395/2.29
5,745,871 A * 4/1998 Chen .......................... 704/219
5,761,635 A 6/1998 Jarvinen ..................... 704/223
5,991,717 A * 11/1999 Minde et al. ............... 704/223

FOREIGN PATENT DOCUMENTS

EP 0 396 121 A1 11/1990
EP 0747 884 A2 12/1996
WO WO 96/24925 8/1996

OTHER PUBLICATIONS

"Toll Quality Variable–Rate Speech Codec", P. Ojala, Proc. Of IEEE International Conference on Acoustics, Speech and Signal Processing, 1997.
"Efficient Vector Quantisation of LPC Parameters at 24 Bits/Frame" Kuldip et al., IEEE Trans. Speech and Audio Processing, vol. 1, No. 1, 1993.

* cited by examiner

*Primary Examiner*—David D. Knepper
(74) *Attorney, Agent, or Firm*—Perman & Green, LLP

(57) ABSTRACT

A variable bit-rate speech coding method determines for each subframe a quantised vector d(i) comprising a variable number of pulses. An excitation vector c(i) for exciting LTP and LPC synthesis filters is derived by filtering the quantised vector d(i), and a gain value $g_c$ is determined for scaling the pulse amplitude excitation vector c(i) such that the scaled excitation vector represents the weighted residual signal $\tilde{s}$ remaining in the subframe speech signal after removal of redundant information by LPC and LTP analysis. A predicted gain value $\hat{g}_c$ is determined from previously processed subframes, and as a function of the energy $E_c$ contained in the excitation vector c(i) when the amplitude of that vector is scaled in dependence upon the number of pulses m in the quantised vector d(i). A quantised gain correction factor $\hat{\gamma}_{gc}$ is then determined using the gain value $g_c$ and the predicted gain value $\hat{g}_c$.

16 Claims, 4 Drawing Sheets

SPEECH CODING

FIELD OF THE INVENTION

The present invention relates to speech coding and more particularly to the coding of speech signals in discrete time subframes containing digitised speech samples. The present invention is applicable in particular, though not necessarily, to variable bit-rate speech coding.

BACKGROUND OF THE INVENTION

In Europe, the accepted standard for digital cellular telephony is known under the acronym GSM (Global System for Mobile communications). A recent revision of the GSM standard has resulted in the specification of a new speech coding algorithm (or codec) known as Enhanced Full Rate (EFR). As with conventional speech codecs, EFR is designed to reduce the bit-rate required for an individual voice or data communication. By minimising this rate, the number of separate calls which can be multiplexed onto a given signal bandwidth is increased.

A very general illustration of the structure of a speech encoder similar to that used in EFR is shown in FIG. 1. A sampled speech signal is divided into 20 ms frames x, each containing 160 samples. Each sample is represented digitally by 16 bits. The frames are encoded in turn by first applying them to a linear predictive coder (LPC) 1 which generates for each frame a set of LPC coefficients a. These coefficients are representative of the short term redundancy in the frame.

The output from the LPC 1 comprises the LPC coefficients a and a residual signal $r_1$ produced by removing the short term redundancy from the input speech frame using a LPC analysis filter. The residual signal is then provided to a long term predictor (LTP) 2 which generates a set of LTP parameters b which are representative of the long term redundancy in the residual signal $r_1$, and also a residual signal s from which the long term redundancy is removed. In practice, long term prediction is a two stage process, involving (1) a first open loop estimate long term prediction is a two stage process, involving (1) a first open loop estimate of a set of LTP parameters for the entire frame and (2) a second closed loop refinement of the estimated parameters to generate a set of LTP parameters for each 40 sample subframe of the frame. The residual signal s provided by LTP 2 is in turn filtered through filters 1/A(z) and W(z) (shown commonly as block 2*a* in FIG. 1) to provide a weighted residual signal $\tilde{s}$. The first of these filters is an LPC synthesis filter whilst the second is a perceptual weighting filter emphasising the "formant" structure of the spectrum. Parameters for both filters are provided by the LPC analysis stage (block 1).

An algebraic excitation codebook 3 is used to generate excitation (or innovation) vectors c. For each 40 sample subframe (four subframes per frame), a number of different "candidate" excitation vectors are applied in turn, via a scaling unit 4, to a LTP synthesis filter 5. This filter 5 receives the LTP parameters for the current subframe and introduces into the excitation vector the long term redundancy predicted by the LTP parameters. The resulting signal is then provided to a LPC synthesis filter 6 which receives the LPC coefficients for successive frames. For a given subframe, a set of LPC coefficients are generated using frame to frame interpolation and the generated coefficients are in turn applied to generate a synthesized signal ss.

The encoder of FIG. 1 differs from earlier Code Excited Linear Prediction (CELP) encoders which utilise a codebook containing a predefined set of excitation vectors. The former type of encoder instead relies upon the algebraic generation and specification of excitation vectors (see for example WO9624925) and is sometimes referred to as an Algebraic CELP or ACELP. More particularly, quantised vectors d(i) are defined which contain 10 non-zero pulses. All pulses can have the amplitudes +1 or −1. The 40 sample positions (i=0 to 39) in a subframe are divided into 5 "tracks", where each track contains two pulses (i.e. at two of the eight possible positions), as shown in the following table.

TABLE 1

Potential positions of individual pulses in the algebraic codebook.

| Track | Pulse | positions |
|---|---|---|
| 1 | $i_0$, $i_5$ | 0, 5, 10, 15, 20, 25, 30, 35 |
| 2 | $i_1$, $i_6$ | 1, 6, 11, 16, 21, 26, 31, 36 |
| 3 | $i_2$, $i_7$ | 2, 7, 12, 17, 22, 27, 32, 37 |
| 4 | $i_3$, $i_8$ | 3, 8, 13, 18, 23, 28, 33, 38 |
| 5 | $i_4$, $i_9$ | 4, 9, 14, 19, 24, 29, 34, 39 |

Each pair of pulse positions in a given track is encoded with 6 bits (i.e. 3 bits for each pulse giving a total of 30 bits), whilst the sign of the first pulse in the track is encoded with 1 bit (a total of 5 bits). The sign of the second pulse is not specifically encoded but rather is derived from its position relative to the first pulse. If the sample position of the second pulse is prior to that of the first pulse, then the second pulse is defined as having the opposite sign to the first pule, otherwise both pulses are defined as having the same sign. All of the 3-bit pulse positions are Gray coded in order to improve robustness against channel errors, allowing the quantised vectors to be encoded with a 35-bit algebraic code u.

In order to generate the excitation vector c(i), the quantised vector d(i) defined by the algebraic code u is filtered through a pre-filter $F_E(z)$ which enhances special spectral components in order to improve synthesized speech quality. The pre-filter (sometimes known as a "colouring" filter) is defined in terms of certain of the LTP parameters generated for the subframe.

As with the conventional CELP encoder, a difference unit 7 determines the error between the synthesized signal and the input signal on a sample by sample basis (and subframe by subframe). A weighting filter 8 is then used to weight the error signal to take account of human audio perception. For a given subframe, a search unit 9 selects a suitable excitation vector {c(i) where i=0 to 39}, from the set of candidate vectors generated by the algebraic codebook 3, by identifying the vector which minimises the weighted mean square error. This process is commonly known as "vector quantisation".

As already noted, the excitation vectors are multiplied at the scaling unit 4 by a gain $g_c$. A gain value is selected which results in the scaled excitation vector having an energy equal to the energy of the weighted residual signal $\tilde{s}$ provided by the LTP 2. The gain is given by:

$$g_c = \frac{\tilde{s}^T Hc(i)}{c(i)^T H^T Hc(i)} \tag{1}$$

where H is the linear prediction model (LTP and LPC) impulse response matrix.

It is necessary to incorporate gain information into the encoded speech subframe, together with the algebraic code defining the excitation vector, to enable the subframe to be accurately reconstructed. However, rather than incorporating the gain $g_c$ directly, a predicted gain $\hat{g}_c$ is generated in a processing unit 10 from previous speech subframes, and a correction factor determined in a unit 11, i.e.:

$$\gamma_{gc}=g_c/\hat{g}_c \tag{2}$$

The correction factor is then quantised using vector quantisation with a gain correction factor codebook comprising 5-bit code vectors. It is the index vector $v_\gamma$ identifying the quantised gain correction factor $\hat{\gamma}_{gc}$ which is incorporated into the encoded frame. Assuming that the gain $g_c$ varies little from frame to frame, $\gamma_{gc}\cong 1$ and can be accurately quantised with a relatively short codebook.

In practice, the predicted gain $\hat{g}_c$ is derived using a moving average (MA) prediction with fixed coefficients. A 4th order MA prediction is performed on the excitation energy as follows. Let E(n) be the mean-removed excitation energy (in dB) at subframe n, given by:

$$E(n) = 10\log\left(\frac{1}{N}g_c^2\sum_{i=0}^{N-1}c^2(i)\right)-\overline{E} \tag{3}$$

where N=40 is the subframe size, c(i) is the excitation vector (including pre-filtering), and $\overline{E}$=36 dB is a predetermined mean of the typical excitation energy.

The energy for the subframe n can be predicted by:

$$\hat{E}(n) = \sum_{i=1}^{4} b_i\hat{R}(n-i) \tag{4}$$

where $[b_1 b_2 b_3 b_4]$=[0.68 0.58 0.34 0.19] are the MA prediction coefficients, and $\hat{R}(j)$ is the error in the predicted energy $\hat{E}(j)$ at subframe j. The error for the current subframe is calculated, for use in processing the subsequent subframe, according to the equation:

$$\hat{R}(n)=E(n)-\hat{E}(n) \tag{5}$$

The predicted energy can be used to compute the predicted gain $\hat{g}_c$ by substituting $\hat{E}(n)$ for E(n) in equation (3) to give:

$$\hat{g}_c=10^{0.05(\hat{E}(n)+\overline{E}-E_c)} \tag{6}$$

where $$E_c = 10\log\left(\frac{1}{N}\sum_{i=0}^{N-1}c^2(i)\right) \tag{7}$$

is the energy of the excitation vector c(i).

The gain correction factor codebook search is performed to identify the quantised gain correction factor $\hat{\gamma}g_c$ which minimises the error:

$$e_Q=(g_c-\hat{\gamma}_{gc}\hat{g}_c)^2. \tag{8}$$

The encoded frame comprises the LPC coefficients, the LTP parameters, the algebraic code defining the excitation vector, and the quantised gain correction factor codebook index. Prior to transmission, further encoding is carried out on certain of the coding parameters in a coding and multiplexing unit 12. In particular, the LPC coefficients are converted into a corresponding number of line spectral pair (LSP) coefficients as described in 'Efficient Vector Quantisation of LPC Parameters at 24 Bits/Frame', Kuldip K. P. and Bishnu S. A., IEEE Trans. Speech and Audio Processing, Vol 1, No 1, January 1993. The entire coded frame is also encoded to provide for error detection and correction. The codec specified for GSM Phase 2 encodes each speech frame with exactly the same number of bits, i.e. 244, rising to 456 after the introduction of convolution coding and the addition of cyclic redundancy check bits.

FIG. 2 shows the general structure of an ACELP decoder, suitable for decoding signals encoded with the encoder of FIG. 1. A demultiplexer 13 separates a received encoded signal into its various components. An algebraic codebook 14, identical to the codebook 3 at the encoder, determines the code vector specified by the 35-bit algebraic code in the received coded signal and pre-filters (using the LTP parameters) this to generate the excitation vector. A gain correction factor is determined from a gain correction factor codebook, using the received quantised gain correction factor, and this is used in block 15 to correct the predicted gain derived from previously decoded subframes and determined in block 16. The excitation vector is multiplied at block 17 by the corrected gain before applying the product to an LTP synthesis filter 18 and a LPC synthesis filter 19. The LTP and LPC filters receive respectively the LTP parameters and LPC coefficients conveyed by the coded signal and reintroduce long term and short term redundancy into the excitation vector.

Speech is by its very nature variable, including periods of high and low activity and often relative silence. The use of fixed bit-rate coding may therefore be wasteful of bandwidth resources. A number of speech codecs have been proposed which vary the coding bit rate frame by frame or subframe by subframe. For example, U.S. Pat. No. 5,657,420 proposes a speech codec for use in the US CDMA system and in which the coding bit-rate for a frame is selected from a number of possible rates depending upon the level of speech activity in the frame.

With regard to the ACELP codec, it has been proposed to classify speech signal subframes into two or more classes and to encode the different classes using different algebraic codebooks. More particularly, subframes for which the weighted residual signal $\tilde{s}$ varies only slowly with time may be coded using code vectors d(i) having relatively few pulses (e.g. 2) whilst subframes for which the weighted residual signal varies relatively quickly may be coded using code vectors d(i) having a relatively large number of pulses (e.g. 10).

With reference to equation (7) above, a change in the number of excitation pulses in the code vector d(i) from for example 10 to 2 will result in a corresponding reduction in the energy of the excitation vector c(i). As the energy prediction of equation (4) is based on previous subframes, the prediction is likely to be poor following such a large reduction in the number of excitation pulses. This in turn will result in a relatively large error in the predicted gain $\hat{g}_c$, causing the gain correction factor to vary widely across the speech signal. In order to be able to accurately quantise this widely varying gain correction factor, the gain correction factor quantisation table must be relatively large, requiring a correspondingly long codebook index $v_\gamma$, e.g. 5 bits. This adds extra bits to the coded subframe data.

It will be appreciated that large errors in the predicted gain may also arise in CELP encoders, where the energy of the code vectors d(i) varies widely from frame to frame, requiring a similarly large codebook for quantising the gain correction factor.

SUMMARY OF THE INVENTION

It is an object of the present invention to overcome or at least mitigate the above noted disadvantage of the existing variable rate codecs.

According to a first aspect of the present invention there is provided method of coding a speech signal which signal comprises a sequence of subframes containing digitised speech samples, the method comprising, for each subframe:

(a) selecting a quantised vector d(i) comprising at least one pulse, wherein the number m and position of pulses in the vector d(i) may vary between subframes;

(b) determining a gain value $g_c$ for scaling the amplitude of the quantised vector d(i) or of a further vector c(i) derived from the quantised vector d(i), wherein the scaled vector synthesizes a weighted residual signal $\tilde{s}$;

(c) determining a scaling factor k which is a function of the ratio of a predetermined energy level to the energy in the quantised vector d(i);

(d) determining a predicted gain value $\hat{g}_c$ on the basis of one or more previously processed subframes, and as a function of the energy $E_c$ of the quantised vector d(i) or said further vector c(i) when the amplitude of the vector is scaled by said scaling factor k; and (e) determining a quantised gain correction factor $\hat{\gamma}_{gc}$ using said gain value $g_c$ and said predicted gain value $\hat{g}_c$.

By scaling the energy of the excitation vector as set out above, the present invention achieves an improvement in the accuracy of the predicted gain value $\hat{g}_c$ when the number of pulses (or energy) present in the quantised vector d(i) varies from subframe to subframe. This in turn reduces the range of the gain correction factor $\hat{\gamma}_{gc}$ and enables accurate quantisation thereof with a smaller quantisation codebook than heretofore. The use of a smaller codebook reduces the bit length of the vector required to index the codebook. Alternatively, an improvement in quantisation accuracy may be achieved with the same size of codebook as has heretofore been used.

In one embodiment of the present invention, the number m of pulses in the vector d(i) depends upon the nature of the subframe speech signal. In another alternative embodiment, the number m of pulses is determined by system requirements or properties. For example, where the coded signal is to be transmitted over a transmission channel, the number of pulses may be small when channel interference is high thus allowing more protection bits to be added to the signal. When channel interference is low, and the signal requires fewer protection bits, the number of pulses in the vector may be increased.

Preferably, the method of the present invention is a variable bit-rate coding method and comprises generating said weighted residual signal $\tilde{s}$ by substantially removing long term and short term redundancy from the speech signal subframe, classifying the speech signal subframe according to the energy contained in the weighted residual signal $\tilde{s}$, and using the classification to determine the number of pulses m in the quantised vector d(i).

Preferably, the method comprises generating a set of linear predictive coding (LPC) coefficients a for each frame and a set of long term prediction (LTP) parameters b for each subframe, wherein a frame comprises a plurality of speech subframes, and producing a coded speech signal on the basis of the LPC coefficients, the LTP parameters, the quantised vector d(i), and the quantised gain correction factor $\hat{\gamma}_{gc}$.

Preferably, the quantised vector d(i) is defined by an algebraic code u which code is incorporated into the coded speech signal.

Preferably, the gain value $g_c$ is used to scale said further vector c(i), and that further vector is generated by filtering the quantised vector d(i).

Preferably, the predicted gain value is determined according to the equation:

$$\hat{g}_c = 10^{0.05(\hat{E}(n)+\bar{E}-E_c)}$$

where $\bar{E}$ is a constant and $\hat{E}(n)$ is the prediction of the energy in the current subframe determined on the basis of previous subframes. The predicted energy may be determined using the equation:

$$\hat{E}(n) = \sum_{i=1}^{4} b_i \hat{R}(n-i)$$

where $b_i$ are the moving average prediction coefficients, p is the prediction order, and $\hat{R}(j)$ is the error in the predicted energy $\hat{E}(j)$ at previous subframe j given by:

$$\hat{R}(n) = E(n) - \hat{E}(n)$$

The term $E_c$ is determined using the equation:

$$E_c = 10\log\left(\frac{1}{N}\sum_{i=0}^{N-1}(kc(i))^2\right)$$

where N is the number of samples in the subframe. Preferably:

$$k = \sqrt{\frac{M}{m}}$$

where M is the maximum permissible number of pulses in the quantised vector d(i).

Preferably, the quantisation vector d(i) comprises two or more pulses, where all of the pulses have the same amplitude.

Preferably, step (d) comprises searching a gain correction factor codebook to determine the quantised gain correction factor $\hat{\gamma}_{gc}$ which minimises the error:

$$e_Q = (g_c - \hat{\gamma}_{gc}\hat{g}_c)^2$$

and encoding the codebook index for the identified quantised gain correction factor.

According to a second aspect of the present invention there is provided a method of decoding a sequence of coded subframes of a digitised sampled speech signal, the method comprising for each subframe:

(a) recovering from the coded signal a quantised vector d(i) comprising at least one pulse, wherein the number m and position of pulses in the vector d(i) may vary between subframes;

(b) recovering from the coded signal a quantised gain correction factor $\hat{\gamma}_{gc}$;

(c) determining a scaling factor k which is a function of the ratio of a predetermined energy level to the energy in the quantised vector d(i);

(d) determining a predicted gain value $\hat{g}_c$ on the basis of one or more previously processed subframes, and as a function of the energy $E_c$ of the quantised vector d(i) or a further vector c(i) derived from d(i), when the amplitude of the vector is scaled by said scaling factor k; and (e) correcting the predicted gain value $\hat{g}_c$ using the quantised gain correction factor $\hat{\gamma}_{gc}$ to provide a corrected gain value $g_c$; and (f) scaling the quantised vector d(i) or said further vector c(i) using the gain value $g_c$ to generate an excitation vector synthesizing a residual signal $\tilde{s}$ remaining in the original subframe speech signal after removal of substantially redundant information therefrom.

Preferably, each coded subframe of the received signal comprises an algebraic code u defining the quantised vector d(i) and an index addressing a quantised gain correction factor codebook from where the quantised gain correction factor $\hat{\gamma}_{gc}$ is obtained.

According to a third aspect of the present invention there is provided apparatus for coding a speech signal which signal comprises a sequence of subframes containing digitised speech samples, the apparatus having means for coding each of said subframes in turn, which means comprises:

vector selecting means for selecting a quantised vector d(i) comprising at least one pulse, wherein the number m and position of pulses in the vector d(i) may vary between subframes;

first signal processing means for determining a gain value $g_c$ for scaling the amplitude of the quantised vector d(i) or a further vector c(i) derived from the quantised vector d(i), wherein the scaled vector synthesizes a weighted residual signal $\tilde{s}$;

second signal processing means for determining a scaling factor k which is a function of the ratio of a predetermined energy level to the energy in the quantised vector d(i);

third signal processing means for determining a predicted gain value $\hat{g}_c$ on the basis of one or more previously processed subframes, and as a function of the energy $E_c$ of the quantised vector d(i) or said further vector c(i), when the amplitude of the vector is scaled by said scaling factor k; and fourth signal processing means for determining a quantised gain correction factor $\hat{\gamma}_{gc}$ using said gain value $g_c$ and said predicted gain value $\hat{g}_c$.

According to a fourth aspect of the present invention there is provided apparatus for decoding a sequence of coded subframes of a digitised sampled speech signal, the apparatus having means for decoding each of said subframes in turn, the means comprising:

first signal processing means for recovering from the coded signal a quantised vector d(i) comprising at least one pulse, wherein the number m and position of pulses in the vector d(i) may vary between subframes;

second signal processing means for recovering from the coded signal a quantised gain correction factor $\hat{\gamma}_{gc}$;

third signal processing means for determining a scaling factor k which is a function of the ratio of a predetermined energy level to the energy in the quantised vector d(i);

fourth signal processing means for determining a predicted gain value $\hat{g}_c$ on the basis of one or more previously processed subframes, and as a function of the energy $E_c$ of the quantised vector d(i) or a further vector c(i) derived from the quantised vector, when the amplitude of the vector is scaled by said scaling factor k; and correcting means for correcting the predicted gain value $\hat{g}_c$ using the quantised gain correction factor $\hat{\gamma}_{gc}$ to provide a corrected gain value $g_c$; and scaling means for scaling the quantised vector d(i) or said further vector c(i) using the gain value $g_c$ to generate an excitation vector synthesizing a residual signal $\tilde{s}$ remaining in the original subframe speech signal after removal of substantially redundant information therefrom.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION

Figure 2:
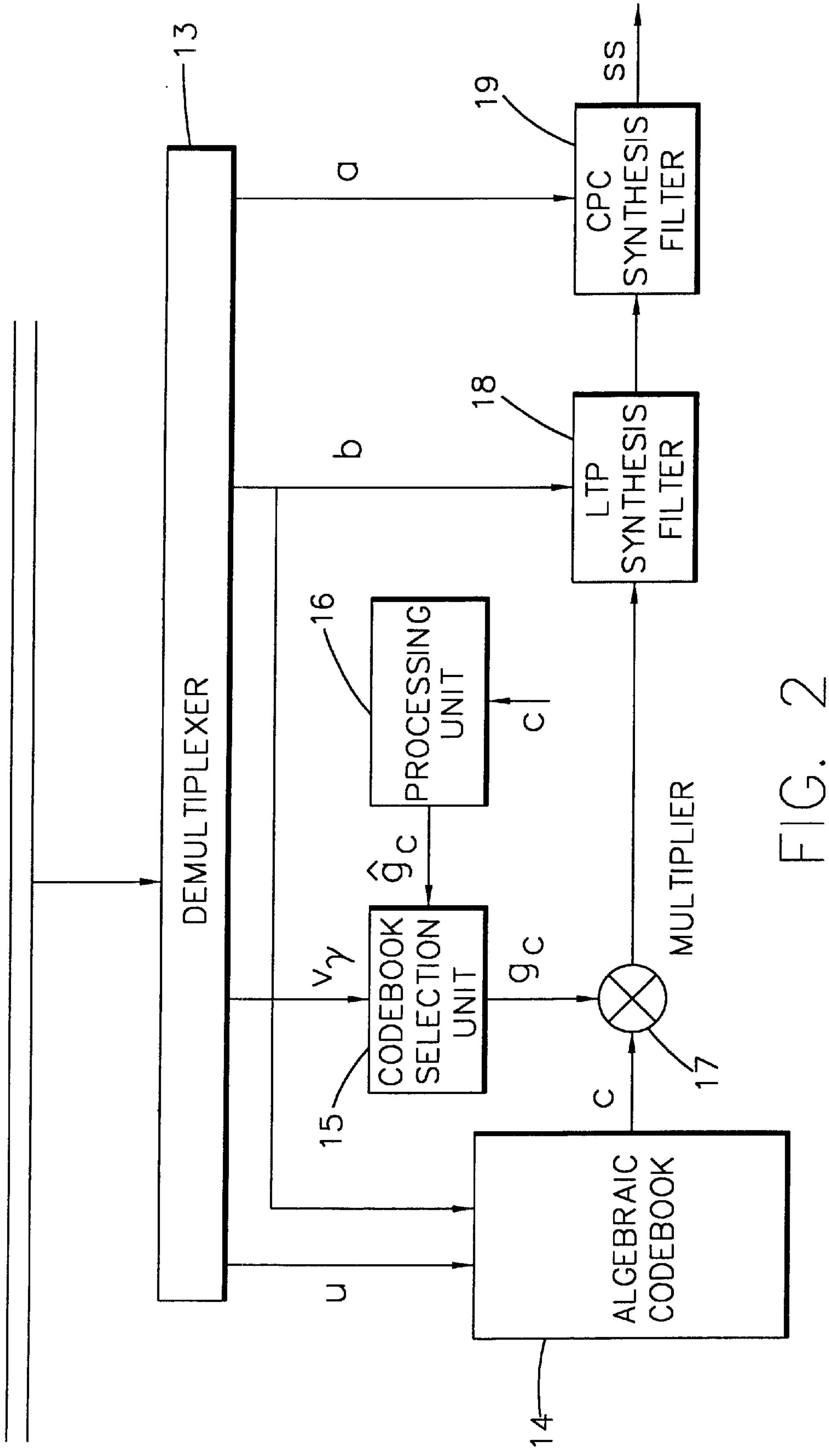
FIG. 2 shows a block diagram of an ACELP speech decoder.
Figure 3:
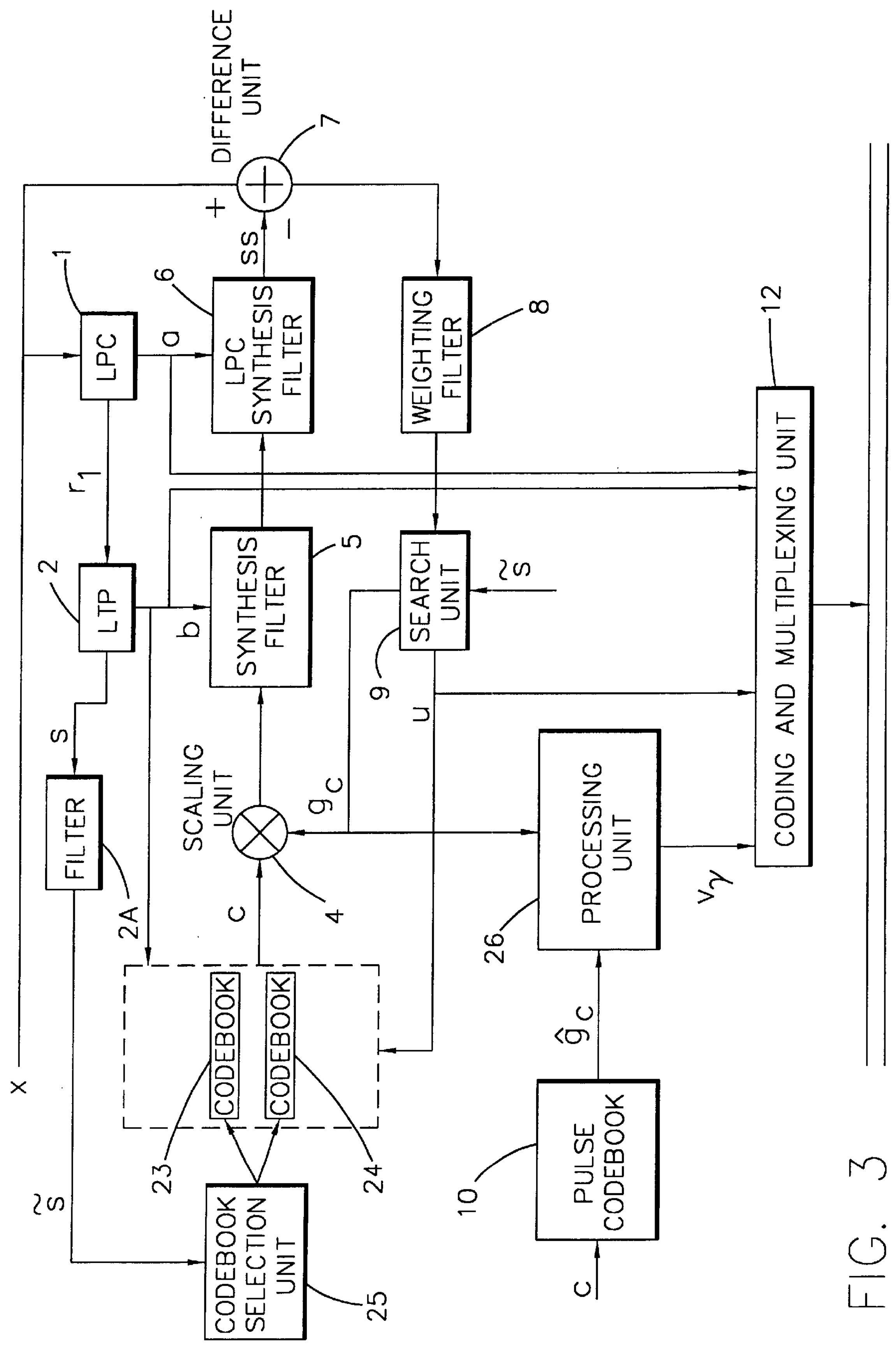
FIG. 3 shows a block diagram of a modified ACELP speech encoder capable of variable bit-rate encoding.

An ACELP speech codec, similar to that proposed for GSM phase 2, has been briefly described above with reference to FIGS. 1 and 2. FIG. 3 illustrates a modified ACELP speech encoder suitable for the variable bit-rate encoding of a digitised sampled speech signal and in which functional blocks already described with reference to FIG. 1 are identified with like reference numerals.

Figure 1:
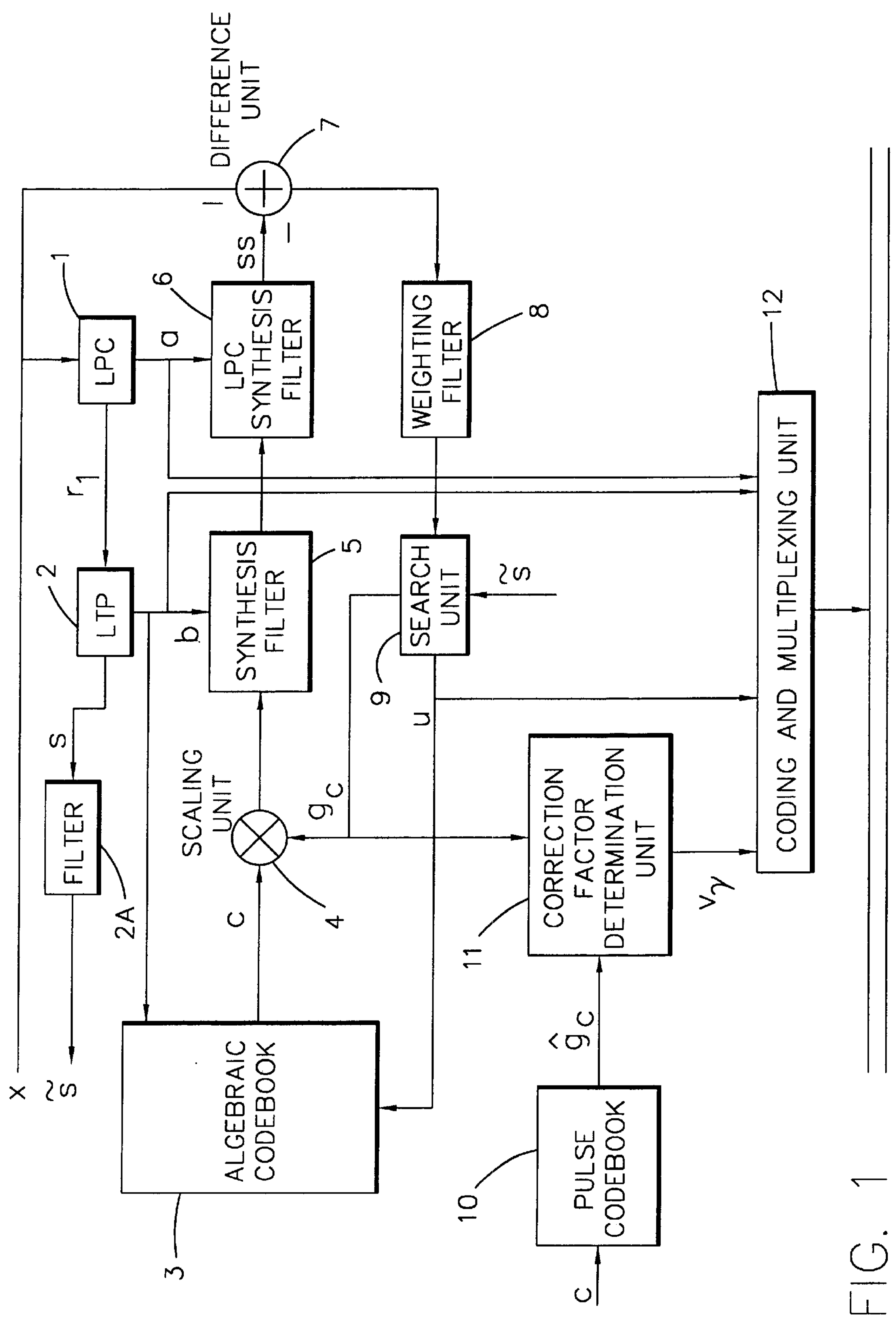
FIG. 1 shows a block diagram of an ACELP speech encoder.

In the encoder of FIG. 3, the single algebraic codebook 3 of FIG. 1 is replaced with a pair of algebraic codebooks 23, 24. A first of the codebooks 23 is arranged to generate excitation vectors c(i) based on code vectors d(i) containing two pulses whilst a second of the codebooks 24 is arranged to generate excitation vectors c(i) based on code vectors d(i) containing ten pulses. For a given subframe, the choice of codebook 23, 24 is made by a codebook selection unit 25 in dependence upon the energy contained in the weighted residual signal $\tilde{s}$ provided by the LTP 2. If the energy in the weighted residual signal exceeds some predefined (or adaptive) threshold, indicative of a highly varying weighted residual signal, the ten pulse codebook 24 is selected. On the other hand, if the energy in the weighted residual signal falls below the defined threshold, then the two pulse codebook 23 is selected. It will be appreciated that two or more threshold levels may be defined in which case three or more codebooks are used. For a more detailed description of a suitable codebook selection process, reference should be made to "Toll Quality Variable-Rate Speech Codec"; Ojala P; Proc. of IEEE International Conference on Acoustics, Speech and Signal Processing, Munich, Germany, Apr. 21–24 1997.

The derivation of the gain $g_c$ for use in the scaling unit 4 is achieved as described above with reference to equation (1). However, in deriving the predicted gain $\hat{g}_c$, equation (7) is modified (in a modified processing unit 26) by applying an amplitude scaling factor k to the excitation vector as follows:

$$E_c = 10\log\left(\frac{1}{N}\sum_{i=0}^{N-1}(kc(i))^2\right) \tag{9}$$

In the case that the ten pulse codebook is selected, k=1, and in the case that the two pulse codebook is selected, k=$\sqrt{5}$. In more general terms, the scaling factor is given by:

$$k = \sqrt{\frac{10}{m}} \tag{10}$$

where m is the number of pulses in the corresponding code vector d(i).

In calculating the mean-removed excitation energy E(n) for a given subframe, to enable energy prediction with equation (4), it is also necessary to introduce scaling factor k. Thus equation (3) is modified as follows:

$$E(n) = 10\log\left(\frac{1}{N}g_c^2\sum_{i=0}^{N-1}(kc(i))^2\right) - \bar{E} \tag{11}$$

The predicted gain is then calculated using equation (6), the modified excitation vector energy given by equation (9), and the modified mean-removed excitation energy given by equation (11).

Introduction of the scaling factor k into equations (9) and (11) considerably improves the gain prediction so that in general $\hat{g}_c \cong g_c$ and $\gamma_{gc} \cong 1$. As the range of the gain correction factor is reduced, as compared with the prior art, a smaller gain correction factor codebook can be used, utilising a shorter length codebook index $v_\gamma$, e.g. 3 or 4 bits.

Figure 4:
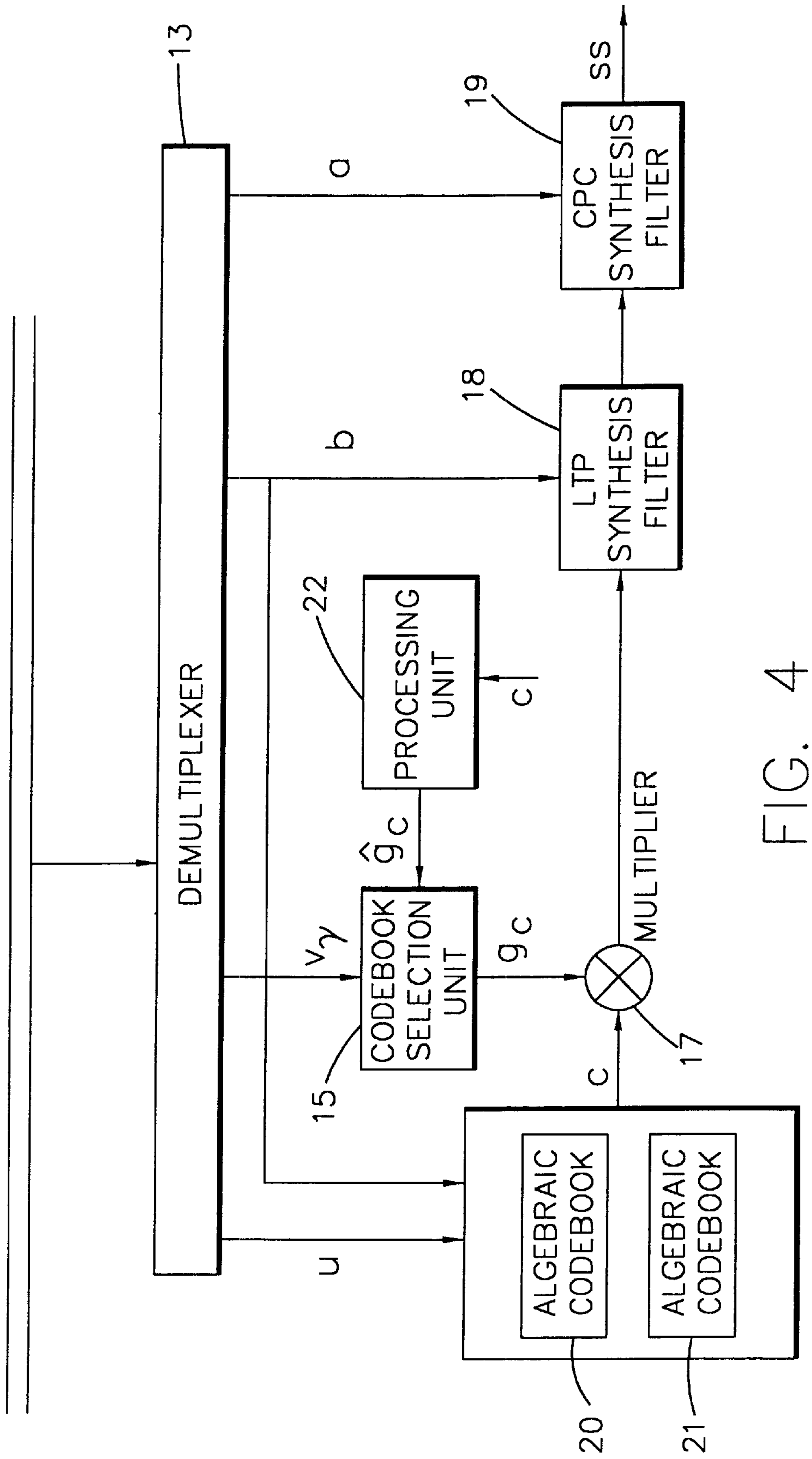
FIG. 4 shows a block diagram of a modified ACELP speech decoder capable of decoding a variable bit-rate encoded signal.

FIG. 4 illustrates a decoder suitable for decoding speech signals encoded with the ACELP encoder of FIG. 3, that is where speech subframes are encoded with a variable bit rate. Much of the functionality of the decoder of FIG. 4 is the same as that of FIG. 3 and as such functional blocks already described with reference to FIG. 2 are identified in FIG. 4 with like reference numerals. The main distinction lies in the provision of two algebraic codebooks 20,21, corresponding to the 2 and 10 pulse codebooks of the encoder of FIG. 3. The nature of the received algebraic code u determines the selection of the appropriate codebook 20,21 after which the decoding process proceeds in much the same way as previously described. However, as with the encoder, the predicted gain $\hat{g}_c$ is calculated in block 22 using equation (6), the scaled excitation vector energy $E_c$ as given by equation (9), and the scaled mean-removed excitation energy E(n) given by equation (11).

It will be appreciated by the skilled person that various modifications may be made to the above described embodiment without departing from the scope of the present invention. It will be appreciated in particular the encoder and decoder of FIGS. 3 and 4 may be implemented in hardware or in software or by a combination of both hardware and software. The above description is concerned with the GSM cellular telephone system, although the present invention may also be advantageously applied to other cellular radio systems and indeed to non-radio communication systems such as the internet. The present invention may also be employed to encode and decode speech data for data storage purposes.

The present invention may be applied to CELP encoders, as well as to ACELP encoders. However, because CELP encoders have a fixed codebook for generating the quantised vector d(i), and the amplitude of pulses within a given quantised vector can vary, the scaling factor k for scaling the amplitude of the excitation vector c(i) is not a simple function (as in equation (10)) of the number of pulses m. Rather, the energy for each quantised vector d(i) of the fixed codebook must be computed and the ratio of this energy, relative to for example, the maximum quantised vector energy, determined. The square root of this ratio then provides the scaling factor k.

What is claimed is:

1. A method of coding a speech signal which signal comprises a sequence of subframes containing digitised speech samples, the method comprising, for each subframe:

(a) selecting a quantised vector d(i) comprising at least one pulse, wherein the number m and position of pulses in the vector d(i) may vary between subframes;

(b) determining a gain value $g_c$ for scaling the amplitude of the quantised vector d(i) or of a further vector c(i) derived from the quantised vector d(i), wherein the scaled vector synthesizes a weighted residual signal $\tilde{s}$;

(c) determining a scaling factor k which is a function of the ratio of a predetermined energy level to the energy in the quantised vector d(i);

(d) determining a predicted gain value $\hat{g}_c$ on the basis of one or more previously processed subframes, and as a function of the energy $E_c$ of the quantised vector d(i) or said further vector c(i) when the amplitude of the vector is scaled by said scaling factor k; and (e) determining a quantised gain correction factor $\hat{\gamma}_{gc}$ using said gain value $g_c$ and said predicted gain value $\hat{g}_c$.

2. A method according to claim 1, the method being a variable bit-rate coding method and comprising:

generating said weighted residual signal $\tilde{s}$ by substantially removing long term and short term redundancy from the speech signal subframe; and classifying the speech signal subframe according to the energy contained in the weighted residual signal $\tilde{s}$, and using the classification to determine the number of pulses m in the quantised vector d(i).

3. A method according to claim 1 and comprising:

generating a set of linear predictive coding (LPC) coefficients a for each frame and a set of long term prediction (LTP) parameters b for each subframe, wherein a frame comprises a plurality of speech subframes; and producing a coded speech signal on the basis of the LPC coefficients, the LTP parameters, the quantised vector d(i), and the quantised gain correction factor $\hat{\gamma}_{gc}$.

4. A method according to claim 1 and comprising defining the quantised vector d(i) in the coded signal by an algebraic code u.

5. A method according to claim 1, wherein the predicted gain value is determined according to the equation:

$$\hat{g}_c = 10^{0.05(\hat{E}(n)+\bar{E}-E_c)}$$

where $\bar{E}$ is a constant and $\hat{E}(n)$ is a prediction of the energy in the current subframe determined on the basis of said previously processed subframes.

6. A method according to claim 1, wherein said predicted gain value $\hat{g}_c$ is a function of the mean removed excitation energy E(n) of the quantised vector d(i) or said further vector c(i), of each of said previously processed subframes, when the amplitude of the vector is scaled by said scaling factor k.

7. A method according to claim 1, wherein the gain value $g_c$ is used to scale said further vector c(i), and that further vector is generated by filtering the quantised vector d(i).

8. A method according to claim 5, wherein:

said predicted gain value $\hat{g}_c$ is a function of the mean removed excitation energy E(n) of the quantised vector d(i) or said further vector c(i), of each of said previously processed subframes, when the amplitude of the vector is scaled by said scaling factor k;

the gain value $g_c$ is used to scale said further vector c(i), and that further vector is generated by filtering the quantised vector d(i); and the predicted energy is determined using the equation:

$$\hat{E}(n) = \sum_{i=1}^{p} b_i \hat{R}(n-i)$$

where $b_i$ are the moving average prediction coefficients, p is the prediction order, and $\hat{R}(j)$ is the error in the predicted energy $\hat{E}(j)$ at previous subframe j, given by:

$$\hat{R}(n)=E(n)-\hat{E}(n)$$

where $$E(n) = 10\log\left(\frac{1}{N} g_c^2 \sum_{i=0}^{N-1} (kc(i))^2\right) - \overline{E}.$$

9. A method according to claim 5, wherein the term $E_c$ is determined using the equation:

$$E_c = 10\log\left(\frac{1}{N} \sum_{i=0}^{N-1} (kc(i))^2\right)$$

where N is the number of samples in the subframe.

10. A method according to claim 1, wherein, if the quantisation vector d(i) comprises two or more pulses, all of the pulses have the same amplitude.

11. A method according to claim 1, wherein the scaling factor is given by:

$$k = \sqrt{\frac{M}{m}}$$

where M is the maximum permissible number of pulses in the quantised vector d(i).

12. A method according to claim 1 and comprising searching a gain correction factor codebook to determine the quantised gain correction factor $\hat{\gamma}_{gc}$ which minimises the error:

$$e_Q=(g_c-\hat{\gamma}_{gc}\hat{g}_c)^2$$

and encoding the codebook index for the identified quantised gain correction factor.

13. A method of decoding a sequence of coded subframes of a digitised sampled speech signal, the method comprising for each subframe:

(a) recovering from the coded signal a quantised vector d(i) comprising at least one pulse, wherein the number m and position of pulses in the vector d(i) may vary between subframes;

(b) recovering from the coded signal a quantised gain correction factor $\hat{\gamma}_{gc}$;

(c) determining a scaling factor k which is a function of the ratio of a predetermined energy level to the energy in the quantised vector d(i);

(d) determining a predicted gain value $\hat{g}_c$ on the basis of one or more previously processed subframes, and as a function of the energy $E_c$ of the quantised vector d(i) or a further vector c(i) derived from the quantised vector, when the amplitude of the vector is scaled by said scaling factor k; and (e) correcting the predicted gain value $\hat{g}_c$ using the quantised gain correction factor $\hat{\gamma}_{gc}$ to provide a corrected gain value $g_c$; and (f) scaling the quantised vector d(i) or said further vector c(i) using the gain value $g_c$ to generate an excitation vector synthesizing a residual signal $\tilde{s}$ remaining in the original subframe speech signal after removal of substantially redundant information therefrom.

14. A method according to claim 13, wherein each coded subframe of the received signal comprises an algebraic code u defining the quantised vector d(i) and an index addressing a quantised gain correction factor codebook from where the quantised gain correction factor $\hat{\gamma}_{gc}$ is obtained.

15. Apparatus for coding a speech signal which signal comprises a sequence of subframes containing digitised speech samples, the apparatus having means for coding each of said subframes in turn, which means comprises:

vector selecting means for selecting a quantised vector d(i) comprising at least one pulse, wherein the number m and position of pulses in the vector d(i) may vary between subframes;

first signal processing means for determining a gain value $g_c$ for scaling the amplitude of the quantised vector d(i) or a further vector c(i) derived from the quantised vector d(i), wherein the scaled vector synthesizes a weighted residual signal $\tilde{s}$;

second signal processing means for determining a scaling factor k which is a function of the ratio of a predetermined energy level to the energy in the quantised vector d(i);

third signal processing means for determining a predicted gain value $\hat{g}_c$ on the basis of one or more previously processed subframes, and as a function of the energy $E_c$ of the quantised vector d(i) or said further vector c(i), when the amplitude of the vector is scaled by said scaling factor k; and fourth signal processing means for determining a quantised gain correction factor $\hat{\gamma}_{gc}$ using said gain value $g_c$ and said predicted gain value $\hat{\gamma}_{gc}$.

16. Apparatus for decoding a sequence of coded subframes of a digitised sampled speech signal, the apparatus having means for decoding each of said subframes in turn, the means comprising:

first signal processing means for recovering from the coded signal a quantised vector d(i) comprising at least one pulse, wherein the number m and position of pulses in the vector d(i) may vary between subframes;

second signal processing means for recovering from the coded signal a quantised gain correction factor $\hat{\gamma}_{gc}$;

third signal processing means for determining a scaling factor k which is a function of the ratio of a predetermined energy level to the energy in the quantised vector d(i);

fourth signal processing means for determining a predicted gain value $\hat{g}_c$ on the basis of one or more previously processed subframes, and as a function of the energy $E_c$ of the quantised vector d(i) or a further vector c(i) derived from the quantised vector when the amplitude of the vector is scaled by said scaling factor k; and correcting means for correcting the predicted gain value $\hat{g}_c$ using the quantised gain correction factor $\hat{\gamma}_{gc}$ to provide a corrected gain value $g_c$; and scaling means for scaling the quantised vector d(i) or said further vector c(i) using the gain value $g_c$ to generate an excitation vector synthesizing a residual signal $\tilde{s}$ remaining in the original subframe speech signal after removal of substantially redundant information therefrom.

* * * * *